US012566634B2

(12) United States Patent
Chernyavsky

(10) Patent No.: US 12,566,634 B2
(45) Date of Patent: Mar. 3, 2026

(54) SYSTEM AND METHOD FOR NON-BLOCKING STATE SYNCHRONIZATION BETWEEN SERVICES

(71) Applicant: EMC IP Holding Company, LLC, Hopkinton, MA (US)

(72) Inventor: Yuri Chernyavsky, Petah Tikva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 997 days.

(21) Appl. No.: 17/507,334

(22) Filed: Oct. 21, 2021

(65) Prior Publication Data

US 2023/0129678 A1 Apr. 27, 2023

(51) Int. Cl.
*G06F 9/46* (2006.01)
*G06F 9/50* (2006.01)

(52) U.S. Cl.
CPC .................................. *G06F 9/5027* (2013.01)

(58) Field of Classification Search
CPC .................................................... G06F 9/5027
See application file for complete search history.

(56) References Cited

U.S. PATENT DOCUMENTS

| | | | |
|---|---|---|---|
| 9,690,763 B1* | 6/2017 | Lee ........................ | G06F 16/954 |
| 2009/0193443 A1* | 7/2009 | Lakshmanan ........... | G06F 9/544 |
| | | | 719/330 |
| 2019/0179919 A1* | 6/2019 | Lewis .................... | H04L 67/133 |
| 2019/0324783 A1* | 10/2019 | Kazak ..................... | G06F 9/542 |

* cited by examiner

*Primary Examiner* — Tammy E Lee
(74) *Attorney, Agent, or Firm* — Brian J. Colandreo; Heath M. Sargeant; Holland & Knight LLP

(57) ABSTRACT

A method, computer program product, and computer system for implementing a backend service for blocking free processing of physical entities events, including add, remove, update, query. Physical entities blocking delays may be delegated to maintenance tasks, which may run under a single thread with a scheduler and may merge successive pending events.

14 Claims, 5 Drawing Sheets

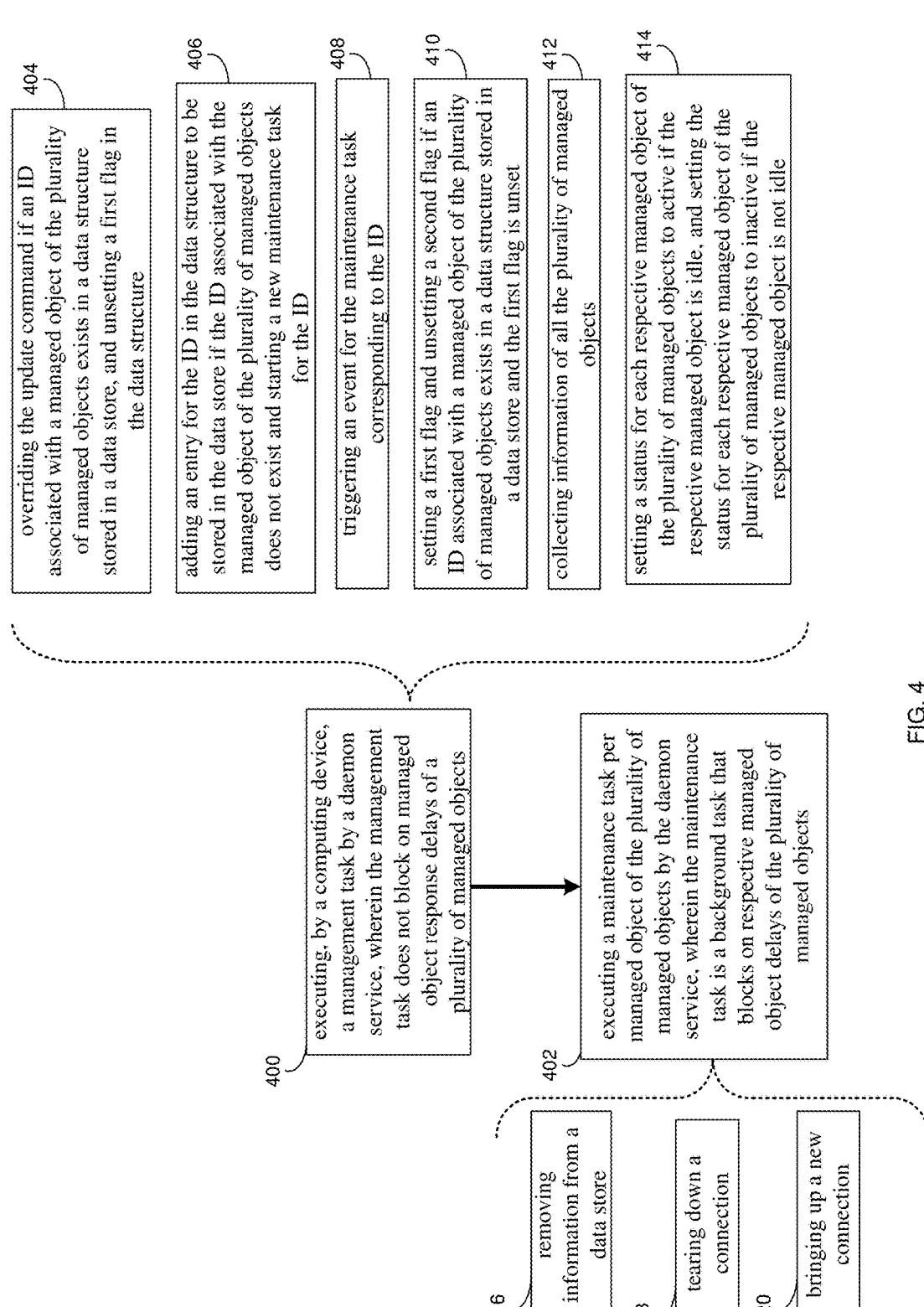

FIG. 4

400 — executing, by a computing device, a management task by a daemon service, wherein the management task does not block on managed object response delays of a plurality of managed objects 402 — executing a maintenance task per managed object of the plurality of managed objects by the daemon service, wherein the maintenance task is a background task that blocks on respective managed object delays of the plurality of managed objects 404 — overriding the update command if an ID associated with a managed object of the plurality of managed objects exists in a data structure stored in a data store, and unsetting a first flag in the data structure 406 — adding an entry for the ID in the data structure to be stored in the data store if the ID associated with the managed object of the plurality of managed objects does not exist and starting a new maintenance task for the ID 408 — triggering an event for the maintenance task corresponding to the ID 410 — setting a first flag and unsetting a second flag if an ID associated with a managed object of the plurality of managed objects exists in a data structure stored in a data store and the first flag is unset 412 — collecting information of all the plurality of managed objects 414 — setting a status for each respective managed object of the plurality of managed objects to active if the respective managed object is idle, and setting the status for each respective managed object of the plurality of managed objects to inactive if the respective managed object is not idle 416 — removing information from a data store 418 — tearing down a connection 420 — bringing up a new connection

10

SYSTEM AND METHOD FOR NON-BLOCKING STATE SYNCHRONIZATION BETWEEN SERVICES

BACKGROUND

Consider an application that manages a set of logical objects corresponding to some physical entities with substantial response times such as network elements or hardware (HW) components. A non-limiting example of such application is an NVME/TCP auto discovery solution that maintains a set of NVMe/TCP ports, each one communicating with a centralized discovery controller through mDNS protocol in conjunction with a TCP/IP based kickstart protocol.

Such application could be split into several microservices. In the above example, it may make sense to split the network interaction including mDNS and kickstart messaging into a "backend" service. The client logic, namely the "frontend" service may control the backend service using some management commands, including at least, e.g., add, remove, update commands. Additionally, it may periodically query the object's state using a query command.

In order to implement the above management protocol, a standard RPC messaging system may be suitable. For simplicity, assume that the frontend service is the initiator of all commands, while the backend service is a responder only. Thus add, remove update are "push" commands, while query is a "pull" command. For each command, the backend service processes the command and replies when finished. The complication is that some commands may block for a substantial period of time so the RPC reply can be delayed. It may be possible to have the backend service queue the incoming commands and process them in background. This way RPC is non-blocking but the command processing is delayed. This is the case, for instance, with the remove command in the example. Notice that during the delete processing backend service may still reply queries regarding the object being deleted as if it still exists. Moreover, if subsequent add command arrives on the same object, backend service may refuse to add this port as the same port still exists and even may confuse the frontend service by adding the stale object info to query replies. Therefore, it may be beneficial to provide non-blocking RPC add, remove, update commands with the microservices maintaining a mutually consistent view of the objects.

BRIEF SUMMARY OF DISCLOSURE

Example embodiments of the present disclosure may include methods for implementing a backend service for managing a set of managed objects. The backend service may consist of a single "management task" that is responsible for processing client commands including at least, for example, add, update, remove, query commands, and a "maintenance task" per each management object. Each management object blocking processing (given its substantial delay times) may be delegated to its respective maintenance task. At times when some maintenance task is blocked, the respective managed object may be reported to the rest of the system as busy thus prohibiting the full use of that object. At all other times the respective managed object may be available for use to the rest of the system. Some backend service implementations may use (but are not limited to the use of) cooperative multitasking (i.e., async/await technology). This way thread allocated cost and locking overhead may be reduced. Note, however, that alternative concurrency technologies such as multithreading or multiprocessing may be used. Most backend service implementations do not require add, update, remove, query commands queuing. In effect, memory footprint is reduced.

In one example implementation, a method, performed by one or more computing devices, may include but is not limited to executing, by a computing device, a management task by a backend service, wherein the management task does not block on managed object response delays of a plurality of managed objects. A maintenance task may be executed per managed object of the plurality of managed objects by the backend service, wherein the maintenance task may be a background task that blocks on respective managed object delays.

One or more of the following example features may be included. All code of the backend service may run in a single thread that includes a scheduler. The management task may process user commands, wherein the user commands may include at least one of an add command, an update command, a remove command, and a query command. When the management task is one of the add command and the update command, one of: the update command may be overridden if an ID associated with a managed object of the plurality of managed objects exists in a data structure stored in a system memory, and a first flag may be unset in the data structure, an entry for the ID may be added in the data structure to be stored in the system memory if the ID associated with the managed object of the plurality of managed objects does not exist and starting a new maintenance task for the ID, and an event for the maintenance task corresponding to the ID may be triggered. When the management task is the remove command, one of: a first flag may be set and a second flag may be unset if an ID associated with a managed object of the plurality of managed objects exists in a data structure stored in a system memory and the first flag is unset, and an event for the maintenance task corresponding to the ID may be triggered. When the management task is the query command, one of: information of all the plurality of managed objects may be collected, and a status may be set for each respective managed object of the plurality of managed objects to active if the respective managed object is idle, and the status may be set for each respective managed object of the plurality of managed objects to inactive if the respective managed object is not idle. Information may be removed from a system memory based upon, at least in part, information in a data structure stored in a system memory. A connection may be torn down based upon, at least in part, information in the data structure stored in the system memory. A new connection may be brought up based upon, at least in part, information in the data structure stored in the system memory.

In another example implementation, a computing system may include one or more processors and one or more memories configured to perform operations that may include but are not limited to executing, by a computing device, a management task by a backend service, wherein the management task does not block on managed object response delays of a plurality of managed objects. A maintenance task may be executed per managed object of the plurality of managed objects by the backend service, wherein the maintenance task may be a background task that blocks on respective managed object delays.

One or more of the following example features may be included. All code of the backend service may run in a single thread that includes a scheduler. The management task may process user commands, wherein the user commands may include at least one of an add command, an update command, a remove command, and a query command. When the management task is one of the add command and the update command, one of: the update command may be overridden if an ID associated with a managed object of the plurality of managed objects exists in a data structure stored in a system memory, and a first flag may be unset in the data structure, an entry for the ID may be added in the data structure to be stored in the system memory if the ID associated with the managed object of the plurality of managed objects does not exist and starting a new maintenance task for the ID, and an event for the maintenance task corresponding to the ID may be triggered. When the management task is the remove command, one of: a first flag may be set and a second flag may be unset if an ID associated with a managed object of the plurality of managed objects exists in a data structure stored in a system memory and the first flag is unset, and an event for the maintenance task corresponding to the ID may be triggered. When the management task is the query command, one of: information of all the plurality of managed objects may be collected, and a status may be set for each respective managed object of the plurality of managed objects to active if the respective managed object is idle, and the status may be set for each respective managed object of the plurality of managed objects to inactive if the respective managed object is not idle. Information may be removed from a system memory based upon, at least in part, information in a data structure stored in a system memory. A connection may be torn down based upon, at least in part, information in the data structure stored in the system memory. A new connection may be brought up based upon, at least in part, information in the data structure stored in the system memory.

In another example implementation, a computer program product may reside on a computer readable storage medium having a plurality of instructions stored thereon which, when executed across one or more processors, may cause at least a portion of the one or more processors to perform operations that may include but are not limited to executing, by a computing device, a management task by a backend service, wherein the management task does not block on managed object response delays of a plurality of managed objects. A maintenance task may be executed per managed object of the plurality of managed objects by the backend service, wherein the maintenance task may be a background task that blocks on respective managed object.

One or more of the following example features may be included. All code of the backend service may run in a single thread that includes a scheduler. The management task may process user commands, wherein the user commands may include at least one of an add command, an update command, a remove command, and a query command. When the management task is one of the add command and the update command, one of: the update command may be overridden if an ID associated with a managed object of the plurality of managed objects exists in a data structure stored in a system memory, and a first flag may be unset in the data structure, an entry for the ID may be added in the data structure to be stored in the system memory if the ID associated with the managed object of the plurality of managed objects does not exist and starting a new maintenance task for the ID, and an event for the maintenance task corresponding to the ID may be triggered. When the management task is the remove command, one of: a first flag may be set and a second flag may be unset if an ID associated with a managed object of the plurality of managed objects exists in a data structure stored in a system memory and the first flag is unset, and an event for the maintenance task corresponding to the ID may be triggered. When the management task is the query command, one of: information of all the plurality of managed objects may be collected, and a status may be set for each respective managed object of the plurality of managed objects to active if the respective managed object is idle, and the status may be set for each respective managed object of the plurality of managed objects to inactive if the respective managed object is not idle. Information may be removed from a system memory based upon, at least in part, information in a data structure stored in a system memory. A connection may be torn down based upon, at least in part, information in the data structure stored in the system memory. A new connection may be brought up based upon, at least in part, information in the data structure stored in the system memory.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4 is an example flowchart of a backend service according to one or more example implementations of the disclosure.

Like reference symbols in the various drawings indicate like elements.

DETAILED DESCRIPTION

Figure 1:
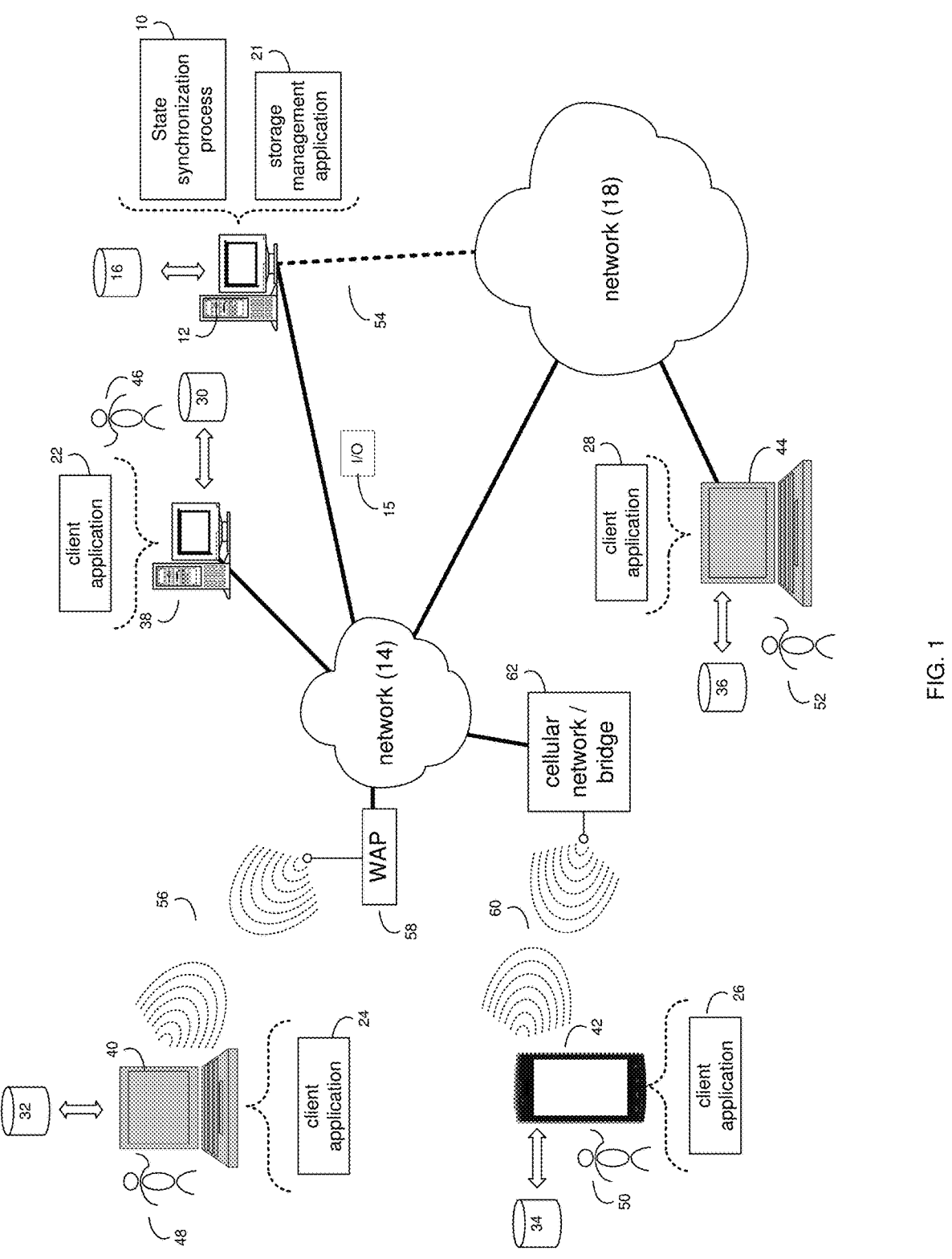
FIG. 1 is an example diagrammatic view of a backend service coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a backend service process 10 (also referred to as backend service 10) that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a Redundant Array of Inexpensive Disks/Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a backend service, such as backend service 10 of FIG. 1, may execute, by a computing device, a management task by a backend service, wherein the management task does not block on managed object response delays of a plurality of managed objects. A maintenance task may be executed per managed object of the plurality of managed objects by the backend service, wherein the maintenance task may be a background task that blocks on respective managed object delays.

In some implementations, the instruction sets and subroutines of backend service 10, as well as any of the data/information described throughout, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store, including the data structure noted below. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, backend service 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, backend service 10 and/or storage management application 21 may be accessed via one or more of client applications 22, 24, 26, 28. In some implementations, backend service 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within backend service 10, a component of backend service 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of backend service 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of backend service 10 (and vice versa). Accordingly, in some implementations, backend service 10 may be a purely server-side application, a purely client-side application, or a hybrid server-side/client-side application that is cooperatively executed by one or more of client applications 22, 24, 26, 28 and/or backend service 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, backend service 10, and storage management application 21, taken singly or in any combination, may effectuate some or all of the same functionality, any description of effectuating such functionality via one or more of client applications 22, 24, 26, 28, backend service 10, storage management application 21, or combination thereof, and any described interaction(s) between one or more of client applications 22, 24, 26, 28, backend service 10, storage management application 21, or combination thereof to effectuate such functionality, should be taken as an example only and not to limit the scope of the disclosure.

In some implementations, one or more of users 46, 48, 50, 52 may access computer 12 and backend service 10 (e.g., using one or more of client electronic devices 38, 40, 42, 44) directly through network 14 or through secondary network 18. Further, computer 12 may be connected to network 14 through secondary network 18, as illustrated with phantom link line 54. backend service 10 may include one or more user interfaces, such as browsers and textual or graphical user interfaces, through which users 46, 48, 50, 52 may access backend service 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
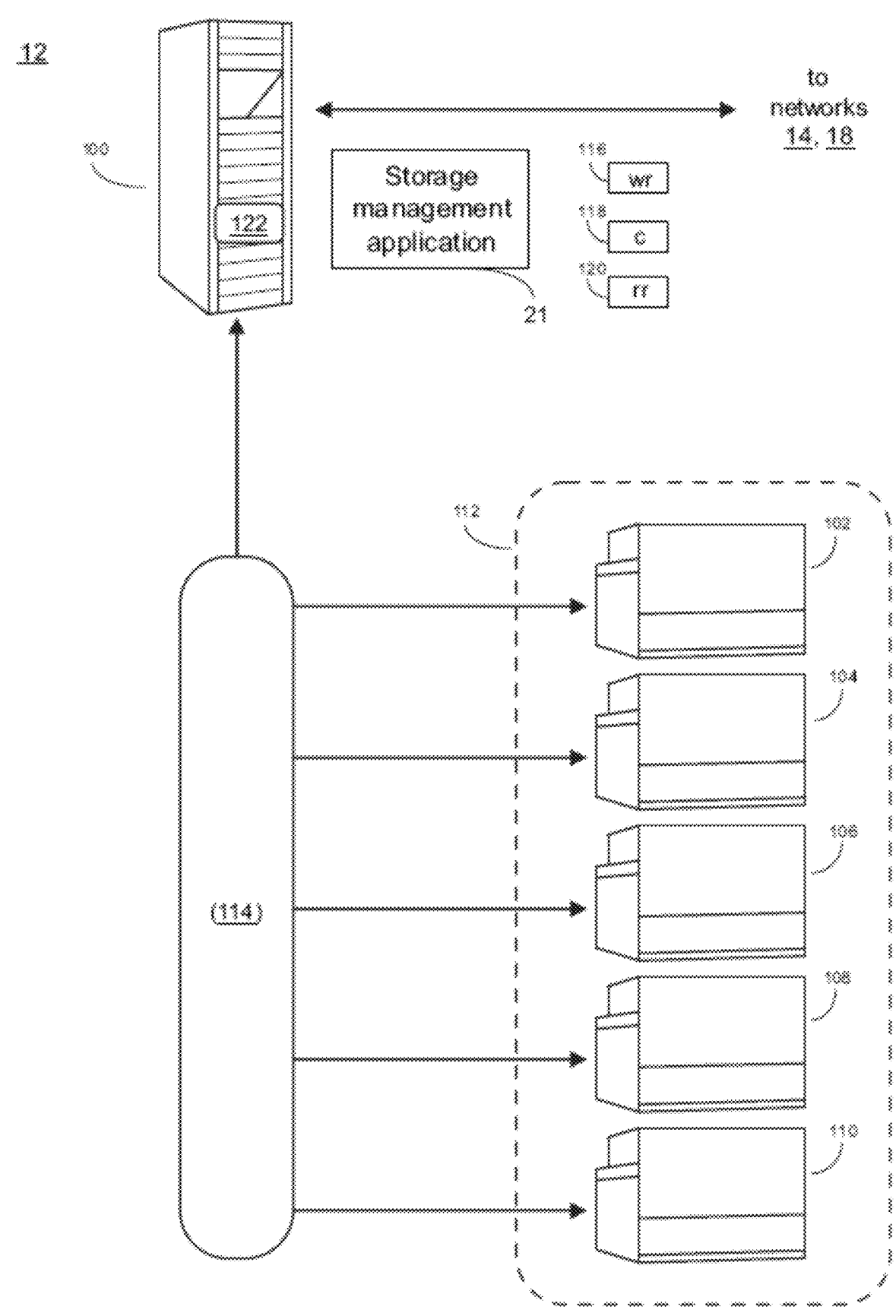
FIG. 2 is an example diagrammatic view of a storage system of FIG. 1 according to one or more example implementations of the disclosure.
Figure 3:
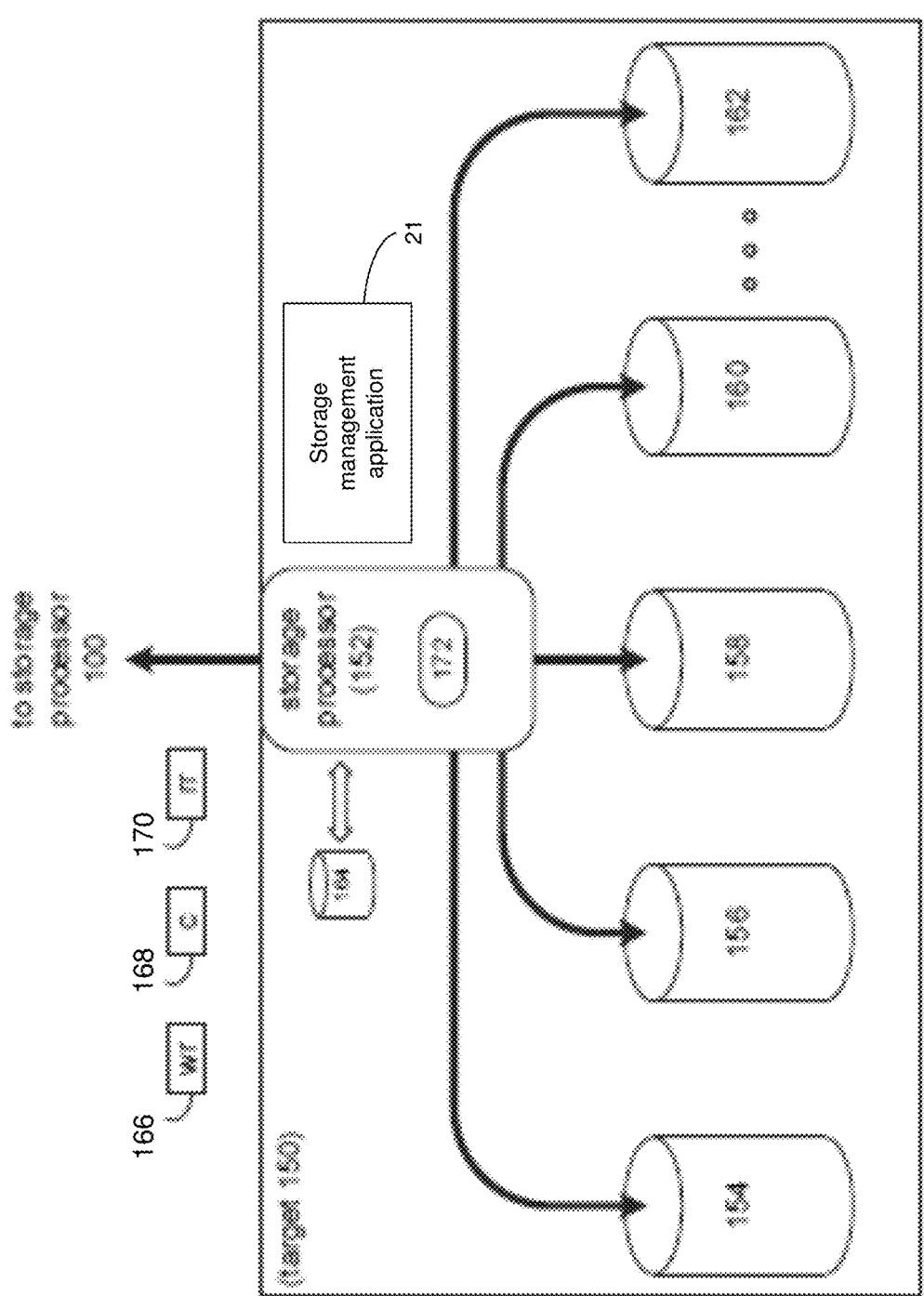
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or backend process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

The Backend Service:

As noted above, generally, consider an application that manages a set of logical objects corresponding to some physical entities with substantial response times such as network elements or hardware components. In the example, systems may typically maintain a set of NVMe/TCP ports, each one communicating with a centralized discovery controller over mDNS protocol in conjunction with a TCP/IP based kickstart protocol. Such an application could be split into several micro-services. In the example, it may make sense to split the network interaction, including various protocol messaging, into a "backend" service. The remaining logic, namely the "frontend" service, controls the backend service using some management commands, e.g., add, remove, update commands. Additionally, the system may periodically query the object's state using query command.

In order to implement the above management protocol, standard RPC messaging systems may be suitable. For simplicity, assume that the frontend service is the initiator of all commands while the backend service is a responder only. Thus, add, remove, update are "push" commands, while query is a "pull" command. For each command, the backend service may process the command and reply when finished. The complication may be, e.g., that some commands may block for a substantial period of time so the RPC reply can be delayed. It may be possible to have the backend service queue the incoming commands and process them in the background. This way, RPC is non-blocking, but the command processing is delayed. This is the case, for instance, with the remove command in the example. Notice that during the delete processing, the backend service may still reply queries regarding the object being deleted as if it still exists. Moreover, if a subsequent add command arrives on the same object, the backend service may refuse to add this port as the same port still exists and even may confuse the frontend service by adding the stale object information to query replies. Therefore, as will be discussed in greater detail below, the present disclosure may show how to provide non-blocking RPC add, remove, update commands with the micro-services maintaining a mutually consistent view of the objects.

Discussed below is a more formal description of the model, followed by an existing method for realizing this model, and then a new method that addresses the issue(s) described above. For instance, consider a set of managed logical objects corresponding to some physical entities. Assume that these entities have substantial bringup and teardown delays. Further assume that objects may be dynamically added, removed or updated at any moment. For each managed object, its present state should be exposed through the system GUI. Managed object state consists of a status that may be either ACTIVE or INACTIVE and system specific managed object information.

Consider an application whose job is to manage the above set of objects. It should handle user add remove and update commands. It should periodically query all managed object states and update the system GUI if needed. The above application may be split into 2 services, namely, the high level frontend service and the low level backend service. The frontend service may expose the managed objects to the rest of the system. That is, it accepts user commands, converts them to the format understandable to the backend service, sends them and waits for a response. It periodically queries the backend service for managed object states and updates the system GUI if needed. The backend service may take care of the communication with the underlying physical objects. It accepts and executes commands sent by the frontend service. It replies to managed object states queries.

The management protocol, namely the communication protocol between the frontend service and the backend service may differ between systems, but normally a simple RPC over TCP/IP socket should suffice. For simplicity, assume that the frontend service is the initiator and the backend service is the responder. The commands may include, e.g., add, remove, update, query commands.

Normally, syncing managed object states between the frontend service and the backend service is done as follows: The frontend service sends a message and blocks until it receives a reply. The backend service receives a command, executes it and replies when finished. As add, remove, update commands may block, frontend service may as well block waiting for the backend service reply. Note that the system generally cannot easily distinguish between a delayed reply and a network outage or backend service crash. Another problem is that the system generally cannot query managed object states while waiting for backend service reply. Thus, the state exposed through system GUI may become out of date. Therefore, as will be discussed below, a new method for syncing managed object states is disclosed, where the management protocol becomes non-blocking, resulting in the above-noted example and non-limiting problems being eliminated.

Figure 5:
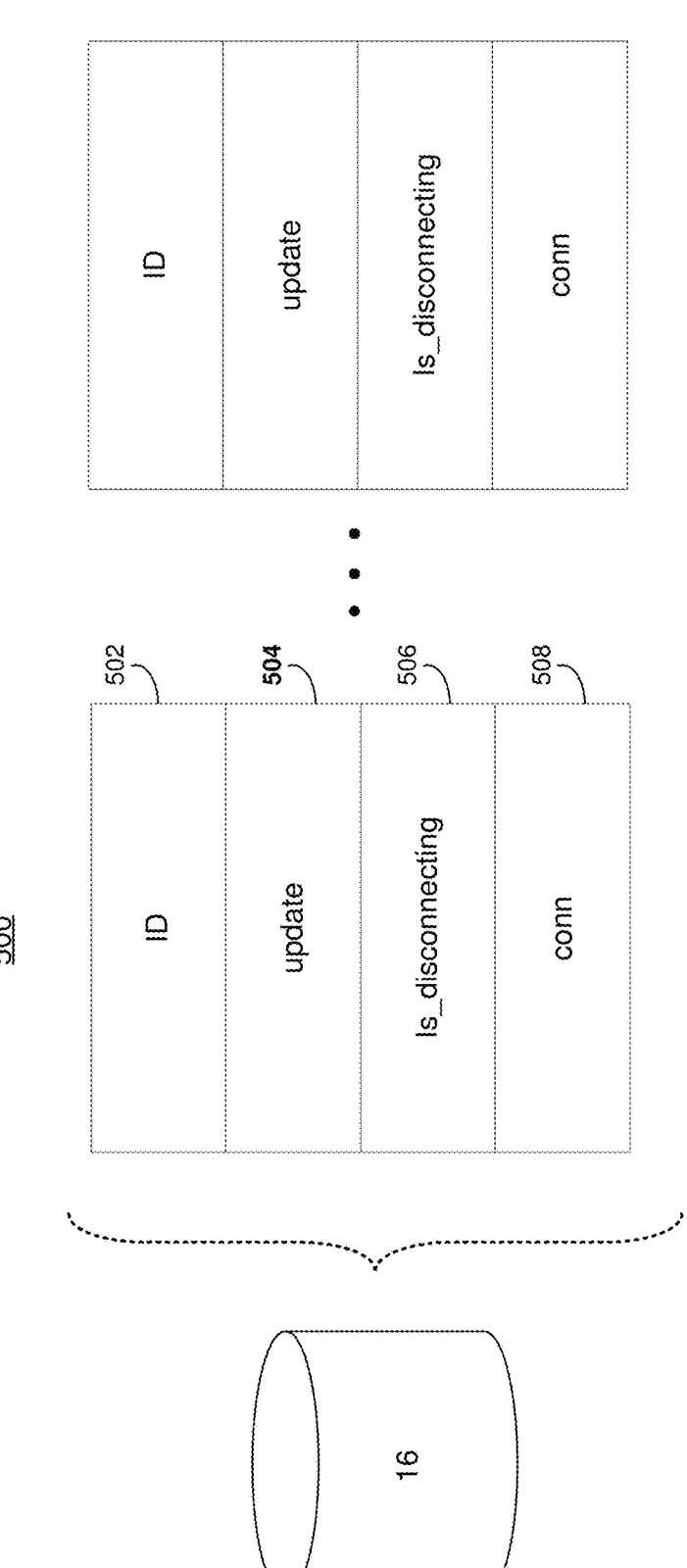
FIG. 5 is an example diagrammatic view of a data structure stored in a system memory according to one or more example implementations of the disclosure.

As discussed above and referring also at least to the example implementations of FIGS. 4-5, backend service 10 may execute 400, by a computing device, a management task by a backend service, wherein the management task does not block on managed object response delays of a plurality of managed objects. Backend service 10 may execute 402 a maintenance task per managed object of the plurality of managed objects by the backend service, wherein the maintenance task may be a background task that blocks on respective managed object delays.

In some implementations, backend service 10 may execute 400, by a computing device, a management task by a backend service, wherein the management task does not block on managed object response delays of a plurality of managed objects, and in some implementations, backend service 10 may execute 402 a maintenance task per managed object of the plurality of managed objects by the backend service, wherein the maintenance task may be a background task that blocks on respective managed object delays. For example, backend service 10 or part of it may execute 400 and run a single management task and may execute 402 and run a maintenance task per managed object.

In some implementations, the management task may process user commands, wherein the user commands may include at least one of an add command, an update command, a remove command, and a query command. For example, the management task may process (e.g., via the backend service 10) user commands, which may typically include, e.g., add, remove, update, and/or query. Note that the management task does not block on managed object response delays. The maintenance tasks, discussed further below, may be background tasks that block on respective managed object delays.

In some implementations, all code of the backend service may run in a single thread that includes a scheduler. For example, thread safety and locking is not discussed, as some example implementations, such as the present use case, may employ async await technology. As a result, all code may be running in a single thread that includes a scheduler, which provides cooperative multitasking. For example, the scheduler may pick up a task every time and run it. Tasks may yield voluntarily so that other task may run. However, it should be noted that multi-threading may also be used instead but it may be more complicated (as locking is needed) and less efficient (as threads may be expensive). This may greatly reduce thread safety concerns and may eliminate the need for locking. In the example use case (which should be taken for example purposes only), the present disclosure may be used where the system has a set of NVME/TCP ports. The communication may use any appropriate protocols. Some example protocols may use multicast UDP messaging while others may use TCP/IP messaging. Both such protocols may use timeouts and retransmits. The backend service 10 may obtain the relevant IP address, port and nqn string. The frontend service may pull this information through the query command (e.g., via backend service 10) and communicate it to the upstream system manager module of backend service 10 and/or storage management application 21. Note that the present disclosure should not be limited to this use case. For instance, the present disclosure may be used to monitor hardware objects or any other objects with slow response times, such as SSDs. Thus, the present disclosure may be used wherever objects need to be managed that may have a long/slow response times.

In some implementations, and referring at least to the example implementation of FIG. 5, an example data structure 500 of a managed object (for processing the above-noted user commands) is shown. In the example, maintenance and/or management task information structures (e.g., data structure 500) may be stored in RAM or other system memory by backend service 10 in a hash table keyed by object ID; however it will be appreciated that other data structures, data stores, storage devices and system memory, and storage location techniques may be used without departing from the scope of the present disclosure. As shown in FIG. 5, example and non-limiting fields for data structure 500 (which may be stored in RAM or other system memory) may include, e.g.:

"ID" 502 (which may be differently labeled without departing from the scope of the present disclosure), may be the object ID of a corresponding managed object in the system memory.

"update" 504 (which may be differently labeled without departing from the scope of the present disclosure), may contain update request details of the corresponding managed object. Generally, when non-null, an outstanding update request exists. Example update request details may include a managed object instance with whatever information the object may have, such as name, IP address, etc.

"is_disconnecting" 506, may be a flag (which may be differently labeled without departing from the scope of the present disclosure) and may indicate whether an outstanding disconnect request exists for the corresponding managed object. For instance, when an object is to be removed and the removal is in progress, the "disconnecting" is set so it is known removal is in progress. If subsequent add/remove/update arrives, it may need to be known if there is a removal in progress or not.

"conn" 508 (which may be differently labeled without departing from the scope of the present disclosure) may be the connection object. Generally, if non-null, an active connection to the underlying physical object (i.e., of the corresponding managed object) exists in the system memory.

Regarding the management task, for each command directed towards a corresponding object ID, backend service 10 may extract the corresponding object ID (e.g., object ID 502 from data structure 500). In some implementations, e.g., for add or update commands, backend service 10 may override 404 the update command if an ID (e.g., object ID 502) associated with a managed object of the plurality of managed objects exists in data structure (e.g., data structure 500) stored in a system memory (e.g., via storage device 16), and a first flag may be unset in data structure 500. For example, if a particular ID exists in the system memory (e.g., hash table), backend service 10 may override update 504 and unset is_disconnecting 506. For instance, first the add command may arrive. While add is in progress, update command with the same ID arrives. Another example is remove command arrives. While remove is in progress, add command with the same ID arrives.

In some implementations, when the management task is one of the add command and the update command, backend service 10 may add 406 an entry for the ID in data structure 500 to be stored in the system memory if the ID associated with the managed object of the plurality of managed objects does not exist, and may start a new maintenance task for the ID. For example, if there is no entry for the particular ID in the system memory, backend service 10 may add an entry in the hash table with ID 502 as the key used for the storage location of the newly added data structure in the hash table, and may start a new maintenance task corresponding to the ID.

As noted above, normally, prior systems that synchronize managed object states between the frontend service and the backend service do it as follows: The frontend service sends a message and blocks until it receives a reply. The backend service receives a command, executes it and replies when finished. As add, remove, update commands may block, frontend service may as well block waiting for the backend service reply. Note that the system generally cannot easily distinguish between a delayed reply and a network outage or backend service crash. Another problem is that the system generally cannot query managed object states while waiting for backend service reply. Thus, the state exposed through system GUI may become out of date. Therefore, as backend service 10 has a new and non-blocking method for syncing managed object states, the management protocol becomes non-blocking, resulting in the above-noted example and non-limiting problems being eliminated. For instance, in some implementations, when the management task is one of the add command and the update command, backend service 10 may trigger 408 an event for the maintenance task corresponding to the ID. For example, backend service 10 may trigger an event for a maintenance task corresponding to the ID. Generally, the object corresponding to the ID may not be used when being changed (e.g., added/updated), and therefore, the object should be continuously queried by backend service 10 to see when the object is free; however, the object itself is not blocked (i.e., non-blocking).

In some implementations, e.g., for the remove command, backend service 10 may set 410 a first flag and unset a second flag if an ID associated with a managed object of the plurality of managed objects exists in data structure 500 stored in the system memory and the first flag is unset. For example, for the remove command, if the ID exists in the hash table and is_disconnected 506 is unset, backend service 10 may set is_disconnecting 506 and unset update 504, and may also trigger 408 an event for the maintenance task corresponding to the ID. That is, backend service 10 may trigger an event for the maintenance task corresponding to ID 502. The scheduler may be used to schedule these triggered events. For example, the maintenance task may yield the control and wait for an event. This is generally how cooperative multitasking works. Event means wake up the maintenance task corresponding to ID and let the scheduler run it.

In some implementations, e.g., for the query command, backend service 10 may collect 412 information of all the plurality of managed objects. That is, backend service 10 may collect the information of all managed objects in the example hash table. Additionally, backend service 10 may set 414 a status set for each respective managed object of the plurality of managed objects to active if the respective managed object is idle, and may set the status for each respective managed object of the plurality of managed objects to inactive if the respective managed object is not idle. For instance, for each collected managed object, backend service 10 may set its respective status to ACTIVE if idle, namely, not blocked on response delay, and may set its respective status to INACTIVE if not idle. This information may be collected by the query and is normally presented in the system GUI.

Regarding the maintenance task, backend service 10 may remove 416 information from the system memory based upon, at least in part, information in the data structure stored in the system memory. For example, if is_disconnected 506 is unset and conn 508 is null, and update 504 is null, backend service 10 may remove the information from the hash table and stop. For example, if a managed object was deleted and there are no pending events related to it, the system may no longer care about it and may proceed to clean up after it.

In some implementations, backend service 10 may tear down 418 a connection based upon, at least in part, information in the data structure stored in the system memory. For example, if is_disconnected 506 is set, backend service 10 may teardown the connection and unset is_disconnected 506 and conn 508 when done. Note that the teardown operation is blocking.

In some implementations, backend service 10 may bring up 420 a new connection based upon, at least in part, information in the data structure stored in the system memory. For example, if update 504 is set, backend service 10 may teardown the connection if conn 508 is set, may bring up a new connection and set conn 508. Note that both teardown and bring up operations are blocking. backend service 10 may wait for an event (e.g., a triggering event) and start over. This may occur because a new object is being stored.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
executing, by a computing device, a management task by a backend service, wherein the management task does not block on managed object response delays of a plurality of managed objects, wherein executing the management task per managed object of the plurality of managed objects includes:
    processing a user command using the management task, wherein the user command includes at least one of: an add command and an update command,
    in response to the management task being at least one of the add command and the update command;
        adding an entry for an identifier associated with a managed object of the plurality of managed objects in a data structure to be stored in the system memory,
        if the identifier associated with the managed object of the plurality of managed objects does not exist, overriding the update command, and
        if the identifier associated with the managed object of the plurality of managed objects exists in the data structure stored in the system memory, unsetting a first flag in the data structure, and simultaneously receiving a second user command corresponding to the identifier associated with the managed object of the plurality of managed objects, while the update command is still in progress; and
executing a maintenance task per managed object of the plurality of managed objects by the backend service, wherein the maintenance task is a background task that blocks on each respective managed object of the plurality of managed objects, wherein executing the maintenance task per managed object of the plurality of managed objects includes starting a new maintenance task corresponding to the identifier associated with the managed object of the plurality of managed objects.

2. The computer-implemented method of claim 1 wherein all code of the backend service runs in a single thread that includes a scheduler.

3. The computer-implemented method of claim 1 further comprising:
when the management task is a remove command, one of:
    setting the first flag and unsetting a second flag if the identifier associated with the managed object of the plurality of managed objects exists in the data structure stored in the system memory and the first flag is unset, and
    triggering an event for the maintenance task corresponding to the identifier.

4. The computer-implemented method of claim 1 further comprising:

when the management task is a query command, one of:
    collecting information of all the plurality of managed objects, and
    setting a status for each respective managed object of the plurality of managed objects to active if the respective managed object is idle, and setting the status for each respective managed object of the plurality of managed objects to inactive if the respective managed object is not idle.

5. The computer-implemented method of claim 1 further comprising at least one of:
removing information from a system memory based upon, at least in part, information in the data structure stored in a system memory;
tearing down a connection based upon, at least in part, the information in the data structure stored in the system memory; and
bringing up a new connection based upon, at least in part, the information in the data structure stored in the system memory.

6. A computer program product residing on a non-transitory computer readable storage medium having a plurality of instructions stored thereon which, when executed across one or more processors, causes at least a portion of the one or more processors to perform operations comprising:
executing, by a computing device, a management task by a backend service, wherein the management task does not block on managed object response delays of a plurality of managed objects, wherein executing the management task per managed object of the plurality of managed objects includes:
    processing a user command using the management task, wherein the user command includes at least one of: an add command and an update command, and
    in response to the management task being at least one of the add command and the update command:
        adding an entry for an identifier associated with a managed object of the plurality of managed objects in a data structure to be stored in the system memory,
        if the identifier associated with the managed object of the plurality of managed objects does not exist, overriding the update command, and
        if the identifier associated with the managed object of the plurality of managed objects exists in the data structure stored in the system memory, unsetting a first flag in the data structure, and simultaneously receiving a second user command corresponding to the identifier associated with the managed object of the plurality of managed objects, while the update command is still in progress; and
executing a maintenance task per managed object of the plurality of managed objects by the backend service, wherein the maintenance task is a background task that blocks on each respective managed object of the plurality of managed objects, wherein executing the maintenance task per managed object of the plurality of managed objects includes starting a new maintenance task corresponding to the identifier associated with the managed object of the plurality of managed objects.

7. The computer program product of claim 6 wherein all code of the backend service runs in a single thread that includes a scheduler.

8. The computer program product of claim 6 wherein the operations further comprise:
    when the management task is a remove command, one of:

setting the first flag and unsetting a second flag if the identifier associated with the managed object of the plurality of managed objects exists in the data structure stored in the system memory and the first flag is unset, and triggering an event for the maintenance task corresponding to the identifier.

9. The computer program product of claim 6 wherein the operations further comprise:

when the management task is a query command, one of:

collecting information of all the plurality of managed objects, and setting a status for each respective managed object of the plurality of managed objects to active if the respective managed object is idle, and setting the status for each respective managed object of the plurality of managed objects to inactive if the respective managed object is not idle.

10. The computer program product of claim 6 wherein the operations further comprise at least one of:

removing information from a system memory based upon, at least in part, information in the data structure stored in a system memory;

tearing down a connection based upon, at least in part, the information in the data structure stored in the system memory; and bringing up a new connection based upon, at least in part, the information in the data structure stored in the system memory.

11. A computing system including one or more processors and one or more memories configured to perform operations comprising:

executing, by a computing device, a management task by a backend service, wherein the management task does not block on managed object response delays of a plurality of managed objects, wherein executing the management task per managed object of the plurality of managed objects includes:

processing a user command using the management task, wherein the user command includes at least one of: an add command and an update command, and in response to the management task being at least one of the add command and the update command:

adding an entry for an identifier associated with a managed object of the plurality of managed objects in a data structure to be stored in the system memory, if the identifier associated with the managed object of the plurality of managed objects does not exist, overriding the update command, and if the identifier associated with the managed object of the plurality of managed objects exists in the data structure stored in the system memory, unsetting a first flag in the data structure, and simultaneously receiving a second user command corresponding to the identifier associated with the managed object of the plurality of managed objects, while the update command is still in progress; and executing a maintenance task per managed object of the plurality of managed objects by the backend service, wherein the maintenance task is a background task that blocks on each respective managed object of the plurality of managed objects, wherein executing the maintenance task per managed object of the plurality of managed objects includes starting a new maintenance task corresponding to the identifier associated with the managed object of the plurality of managed objects.

12. The computing system of claim 11 wherein the operations further comprise:

when the management task is a remove command, one of:

setting the first flag and unsetting a second flag if the identifier associated with the managed object of the plurality of managed objects exists in the data structure stored in the system memory and the first flag is unset, and triggering an event for the maintenance task corresponding to the identifier.

13. The computing system of claim 11 wherein the operations further comprise:

when the management task is a query command, one of:

collecting information of all the plurality of managed objects, and setting a status for each respective managed object of the plurality of managed objects to active if the respective managed object is idle, and setting the status for each respective managed object of the plurality of managed objects to inactive if the respective managed object is not idle.

14. The computing system of claim 11 wherein the operations further comprise at least one of:

removing information from a system memory based upon, at least in part, information in the data structure stored in a system memory;

tearing down a connection based upon, at least in part, the information in the data structure stored in the system memory; and bringing up a new connection based upon, at least in part, the information in the data structure stored in the system memory.

* * * * *